R. J. BUSTILLO Y DIEGO.
SUSPENSION BEARING.
APPLICATION FILED AUG. 24, 1908.
910,988.
Patented Jan. 26, 1909.
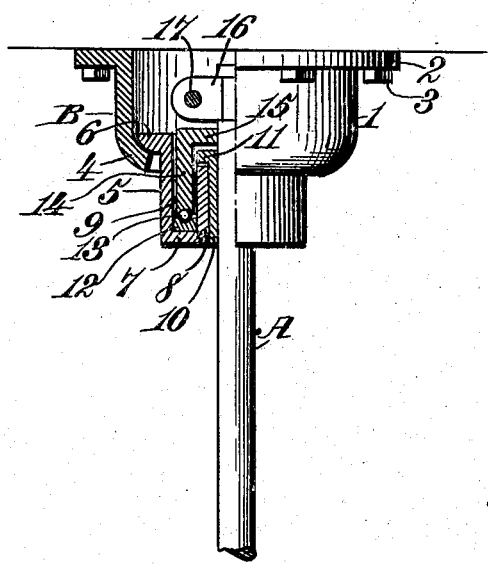
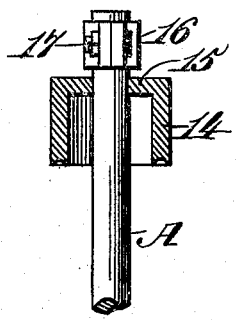
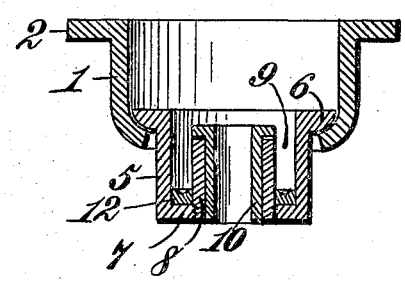
Witnesses:
Inventor:
Ramón J. Bustillo y Diego.
By James L. Norris
Atty.

UNITED STATES PATENT OFFICE.

RAMÓN J. BUSTILLO Y DIEGO, OF HABANÁ, CUBA.

SUSPENSION-BEARING.

No. 910,988. Specification of Letters Patent. Patented Jan. 26, 1909.

Original application filed June 4, 1907, Serial No. 377,277. Divided and this application filed August 24, 1908. Serial No. 450,088.

*To all whom it may concern:*

Be it known that I, RAMÓN J. BUSTILLO Y DIEGO, a citizen of the Republic of Cuba, residing at Habana, Cuba, have invented certain new and useful Improvements in Suspension-Bearings, of which the following is a specification.

This invention relates to new and useful improvements in suspension bearings and more particularly to a bearing in the nature of a hanger for a pendent shaft.

The invention is designed especially for use in connection with the shafts of centrifugal machines of the pendent type, which shafts during the operation of the machine, have, in addition to their rotatory movement, a gyratory action, responsive to centrifugal force.

The present invention aims as a primary object to provide a suspension bearing of novel construction to the end of compensating for the above mentioned gyratory action.

A further object of the invention is to provide a suspension bearing which in its analogy to a hanger shall involve a novel relation of parts towards the ends of reduction of friction due to perfect balance or centering, and of self-lubrication.

The details of construction will be explained in the course of the following description, which is to be read in connection with the annexed drawings, the latter illustrating a preferred and advantageous embodiment of the invention, while the novel features of the invention will be pointed out in the claims, hereunto appended.

In the said drawings:—Figure 1 is an elevation partly in section of a suspension bearing made in accordance with the present invention. Fig. 2 is a sectional view taken at right angles to Fig. 1 and illustrating in isolated relation the elements of the construction which are attached directly to the shaft. Fig. 3 is a sectional view illustrating the hanger elements of the bearing which coöperate with the shaft elements illustrated in Fig. 2.

Similar characters of reference refer to corresponding parts throughout the several views.

The pendent shaft is designated by the letter A and the suspension bearing which serves as a hanger for said shaft, is designated generally by the letter B.

The bearing B includes a stationary supporting tubular member 1 of general cup-shaped form. The upper end of the member 1 is circumscribed by an attaching flange 2 which is held to the ceiling or other support by bolts 3. The lower end portion of the member 1 projects inwardly and is of curvilinear form to afford a seat, as 4, for a hanger element to be described. Said member 1 is open at both ends to allow of the assemblage of a sleeve 5, which at its upper end has an outwardly projecting flange 6 and at its lower end has an inwardly projecting flange 7. The flange 6 engages the seat 4 and towards this end has a rounded under face which conforms to the curvature of the seat 4. It will be understood that the sleeve 5 is somewhat smaller than the opening in the lower end of the member 1 through which said sleeve projects, in order that the latter may have gyratory motion with the shaft A in a manner to be described.

The flange 7 has threaded engagement with the lower end of an upwardly projecting sleeve 8, concentric to the sleeve 5 and defining therewith an annular chamber, as 9. Between the sleeve 8 and the shaft A an annular bushing 10 of anti-friction metal is interposed, which bushing has at its upper end an outwardly projecting flange 11 engaging the sleeve 8 as a support and serves as a bearing for said shaft.

Imposed upon the flange 7 is a hard steel ring 12, which is formed as a race-way for ball bearings 13. The latter reduce the friction of a sleeve 14, disposed loosely and revolubly in the chamber 9. The sleeve 14 supports the shaft A and towards this end is provided with an inwardly projecting annular flange 15 which is connected to said shaft for rotation therewith.

The shaft A is held from downward displacement by a stop device provided on the upper end thereof within the member 1 and comprising more particularly the supplementary yokes 16 which have projecting wings and are clamped frictionally upon said shaft by bolt and nut fastenings 17 engaged through each corresponding pair of wings.

The manner of mounting the sleeve 14 in the chamber 9 permits of said sleeve rotating with the shaft freely in said chamber. As the shaft 8 rapidly rotates, the suspended machine has a certain centrifugal inertia which is imparted to the shaft A. The shaft A consequently has a gyratory movement, which is imparted to the sleeves 5 and 8 by the engagement of the sleeve 14 in the chamber 9. This gyratory movement is compensated for by the manner of engaging the flange 6 provided at the upper end of the sleeve 5 upon the curved annular seat 4 provided on the lower end of the stationary supporting member 1. The chamber 9 in addition to receiving the sleeve 14, may be filled with lubricant to reduce friction between the stationary and movable related bearing parts.

This application is a division of my co-pending application, Serial No. 377,277, filed June 4, 1907.

Having fully described my invention, I claim:—

1. In bearings of the type set forth, in combination, a supporting member formed with an annular curved seat, a pendent shaft, a pendent bearing sleeve having at its upper end a projecting annular portion to engage said seat, said bearing sleeve being mounted for gyratory movement, a second sleeve secured to said bearing sleeve in spaced concentric relation, and hanger means carried by the shaft and engaged for rotation between the sleeves.

2. In bearings of the type set forth, in combination, a supporting member formed with an annular inwardly projecting curved seat, a pendent shaft, a pendent bearing sleeve formed at its upper end with an outwardly projecting annular flange having a rounded underface to engage said curved seat and formed at its lower end with an inwardly projecting flange, a second sleeve secured to the inwardly projecting flange and disposed in spaced concentric relation to the bearing sleeve, a sleeve secured to the shaft for rotation therewith and disposed in the space between said bearing sleeve and said second sleeve, and means for holding the shaft against downward axial displacement.

3. In bearings of the type set forth, a supporting member, shaft supporting means hung therefrom for gyratory movement, a pendent rotatable shaft, means for hanging the shaft from said shaft supporting means, and a bearing bushing interposed between said supporting means and said shaft, said bushing being assembled for removal and having a retaining flange engaging said supporting means and confined between the same and the shaft hanging means.

4. In bearings of the type set forth, in combination, a supporting member formed at its lower end with an inwardly projecting curvilinear seat, a bearing member constructed to rest on said seat for gyratory movement, said bearing member including outer and inner concentric sleeves, a pendent shaft passed through the inner sleeve, means for hanging the shaft from said bearing member for rotation and a removably assembled bearing bushing interposed between the shaft and the inner sleeve and formed with an outwardly projecting flange resting upon the inner sleeve as a support, and confined between the same and the shaft hanging means.

5. In bearings of the type set forth, in combination, a supporting member formed with an inwardly projecting curved seat, a pendent bearing sleeve formed at its upper end with an outwardly projecting flange having a rounded under face to engage said curved seat for gyratory movement and formed at its lower end with an inwardly projecting flange, an inner sleeve secured to said inwardly projecting flange and disposed in spaced concentric relation to the bearing sleeve, a pendent shaft passed through the inner sleeve, a sleeve secured to the shaft for rotation therewith and having its body portion disposed in the space between said bearing sleeve and said inner sleeve, a ball bearing ring resting on said inwardly projecting flange, a plurality of ball bearings supported on said ring to permit of the free rotation of said last named sleeve, a bearing bushing interposed between the shaft and inner sleeve and formed with an outwardly projecting flange resting upon the inner sleeve as a support, and means for holding the shaft against downward axial displacement.

In testimony whereof I have hereunto set my hand in presence of two subscribing witnesses.

RAMÓN J. BUSTILLO Y DIEGO.

Witnesses:
 PASSO,
 B. CARLO.